(12) United States Patent
Hu

(10) Patent No.: US 7,593,011 B2
(45) Date of Patent: Sep. 22, 2009

(54) LIGHT MAP COMPRESSION

(75) Inventor: Yaohua Hu, Beijing (CN)

(73) Assignee: Microsoft Corporation, Redmond, WA (US)

( * ) Notice: Subject to any disclaimer, the term of this patent is extended or adjusted under 35 U.S.C. 154(b) by 275 days.

(21) Appl. No.: 11/275,692

(22) Filed: Jan. 24, 2006

(65) Prior Publication Data

US 2007/0200848 A1    Aug. 30, 2007

(51) Int. Cl.
*G06T 15/00*    (2006.01)
(52) U.S. Cl. .................. 345/426; 345/428; 345/506; 345/589; 345/619
(58) Field of Classification Search .............. 345/426, 345/428, 619, 506, 589
See application file for complete search history.

(56) References Cited

U.S. PATENT DOCUMENTS

| | | | |
|---|---|---|---|
| 6,782,130 B2 * | 8/2004 | Guo ..................... | 382/199 |
| 6,943,805 B2 * | 9/2005 | Snyder et al. ........... | 345/589 |
| 7,176,926 B2 * | 2/2007 | Frisken et al. .......... | 345/473 |
| 7,190,367 B2 * | 3/2007 | Perry et al. ............ | 345/506 |

OTHER PUBLICATIONS

Laurent Balmelli; Slides for Space Optimized Texture Maps; Eurographics 2002; IBM Research Division; New York.
Pedro V. Sander; Abstract for Signal-Specialized Parametrization; Thirteenth Eurographics Workshop on Rendering (2002); Harvard University, Cambridge, MA, USA; Microsoft Research, Redmond, WA, USA.
Pedro V. Sander; Slides for Signal-Specialized Parametrization; Thirteenth Eurographics Workshop on Rendering (2002); Harvard University, Cambridge, MA, USA; Microsoft Research, Redmond, WA, USA.
Pedro V. Sander; Abstract for Texture Mapping Progressive Meshes; Harvard University, Cambridge, MA, USA; Microsoft Research, Redmond, WA, USA.
Keshav Channa; Light Mapping, www.flipcode.com/articles/article_lightmapping.shtml; Jul. 21, 2003.
Laurent Balmelli; Abstract for Space Optimized Texture Maps; Eurographics 2002; IBM Research Division; New York.
Geetika Tewari; Abstract for Signal-Specialized Parameterization for Piecewise Linear Reconstruction; Eurographics Symposium on Geometry Processing (2004); Harvard University, Cambridge, MA, USA; Microsoft Research, Redmond, WA, USA; ATT Research, Marlborough, MA, USA.

* cited by examiner

*Primary Examiner*—Phu K Nguyen

(57) ABSTRACT

A technique to reduce the size of a light map using variable sampling is provided. A surface is identified and divided into various regions in accordance with the frequencies associated with the regions. Different sampling rates for lighting information are allocated to the regions based on the different frequencies associated with the regions. The lighting information is re-sampled in accordance with the allocated sampling rates into a light map.

20 Claims, 7 Drawing Sheets

303

LIGHT MAP COMPRESSION

BACKGROUND

Lighting is an important component for creating realistic graphics for many types of computer applications, such as games and visual design tools. One popular method employed by software developers to generate realistic lighting is the use of light maps. Although light maps are relatively simple to generate and can be pre-computed, these maps are often required to represent lighting in low resolution because of the high memory requirements associated with the maps.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

The present example provides a technique to reduce the size of a light map using variable sampling. A surface is identified and divided into various regions in accordance with the frequencies associated with the regions. Different sampling rates for lighting information are allocated to the regions based on the different frequencies associated with the regions. The lighting information is re-sampled in accordance with the allocated sampling rates into a light map.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Although the present examples are described and illustrated herein as being implemented in a system for applying variable sampling rates to a geometric mesh to generate light maps, the system described is provided as an example and not a limitation. As those skilled in the art will appreciate, the present examples are suitable for application in a variety of different types of systems that are capable of generating compressed light maps.

Figure 1:
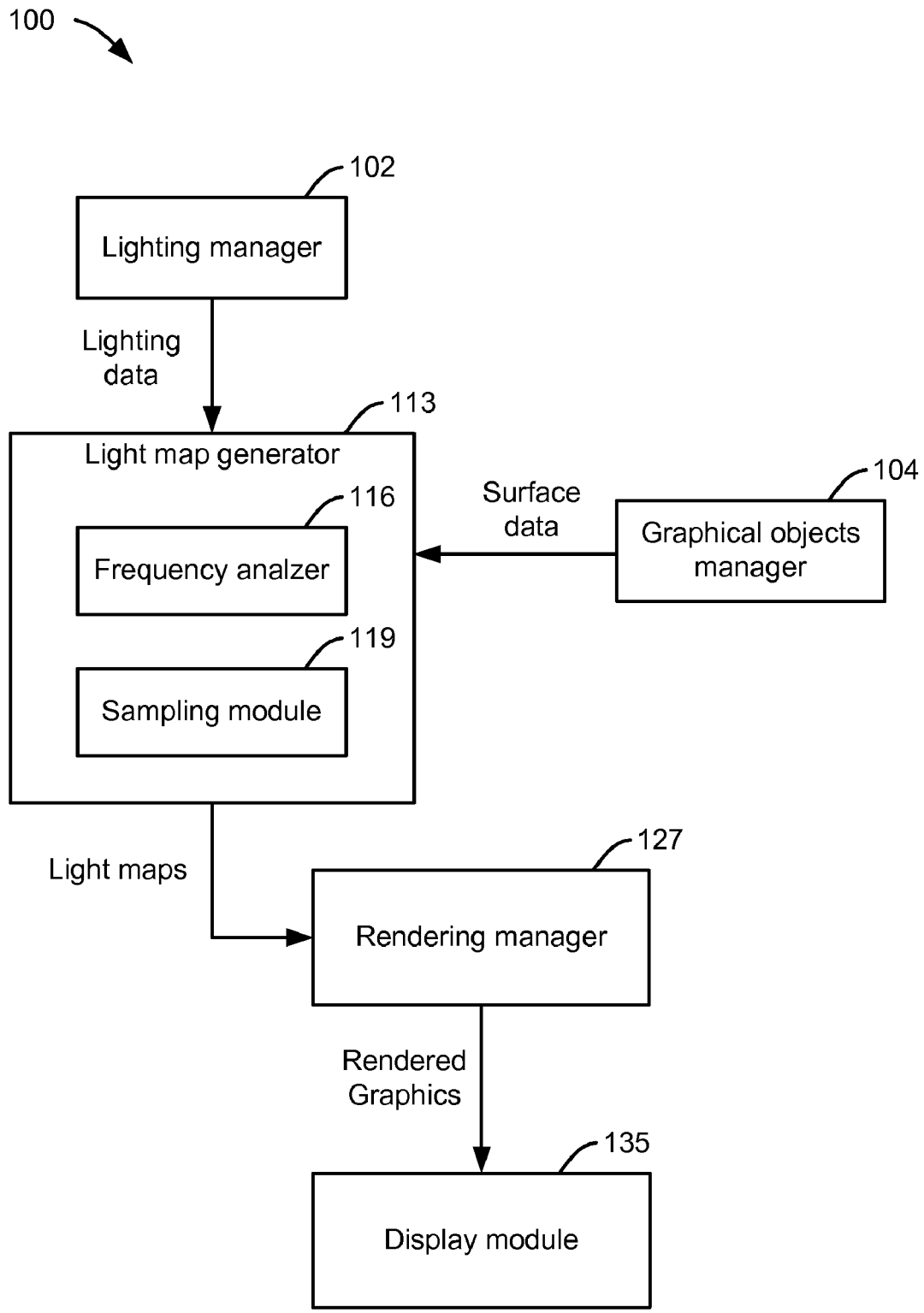
FIG. 1 shows an example system for generating light maps with variable sampling rates.

FIG. 1 shows an example system 100 for generating light maps with variable sampling rates. Example system 100 is typically part of a software application capable of displaying complex graphical information, such as a game, a design tool, a graphical display application, or the like. As show in FIG. 1, example system 100 may include lighting manager 102, graphical objects manager 104, light map generator 113, and rendering manger 127. Graphical objects manager 104 is configured to manage objects associated with the graphics generated by the application. Graphical objects manager 104 is also configured to generate surface data that represents the appearance of the objects and to provide the surface data to light map generator 113 for further processing. For example, the surface data may include a mesh of polygons that represent surfaces of the graphical objects. Lighting manager 102 is configured to determine lighting data of the application and to provide the data to light map generator 113. The lighting data may include the sources and directions of lighting associated with the graphical objects provided by graphical objects manager 104.

Light map generator 113 is configured to receive data from lighting manager 102 and graphical object manager 104, and to generate light maps from the received data. Light map generator 113 may include frequency analyzer 116 and sampling module 119. Frequency analyzer 116 is configured to determine the frequencies associated with different areas of a surface. The frequencies associated with the surface represent the complexity of the features in each area and can be determined in accordance with any frequency analytical method, such as the texture space Laplacian and gradient relative variance per triangle. Frequency analyzer 116 is also configured to tessellate the surface into regions based on the determined frequencies.

Sampling module 119 is configured to identify the regions tessellated by frequency analyzer 116 and to allocate a sampling rate for each region based on the frequency associated with the region. For example, sampling module 119 may allocate low sampling rates for low frequency regions and high sampling rates for high frequency regions. Sampling module 119 may be configured to allocate the sampling rates to achieve the optimal sampling of the surface. For example, sampling module 119 may be configured to provide sampling rates that are high enough to capture the features in the high frequency regions. Sampling module 119 is configured to sample the regions based on the allocated sampling rate associated with each region. Sampling module 119 may be configured to determine an optimal sampling rate for each region so that the sampling rates are not at such high values that the size of the light map generated by the sampling exceeds an allocated maximum size.

Rendering manager 127 is configured to identify the light maps provided by light map generator 113 and to render graphics based on the light maps. The rendered graphics are provided to display module 135, which handles the displaying of the graphical data.

The example system 100 discussed above enables different sampling rates to be used to generate a light map for a surface. The variable sampling rates allow complex lighting features on the surface to be captured with high sampling rates while enabling lower sampling rates to be used on simpler features. The use of variable sampling rates reduces the size of the light map without unduly comprising the lighting details captured by the light map.

Figure 2:
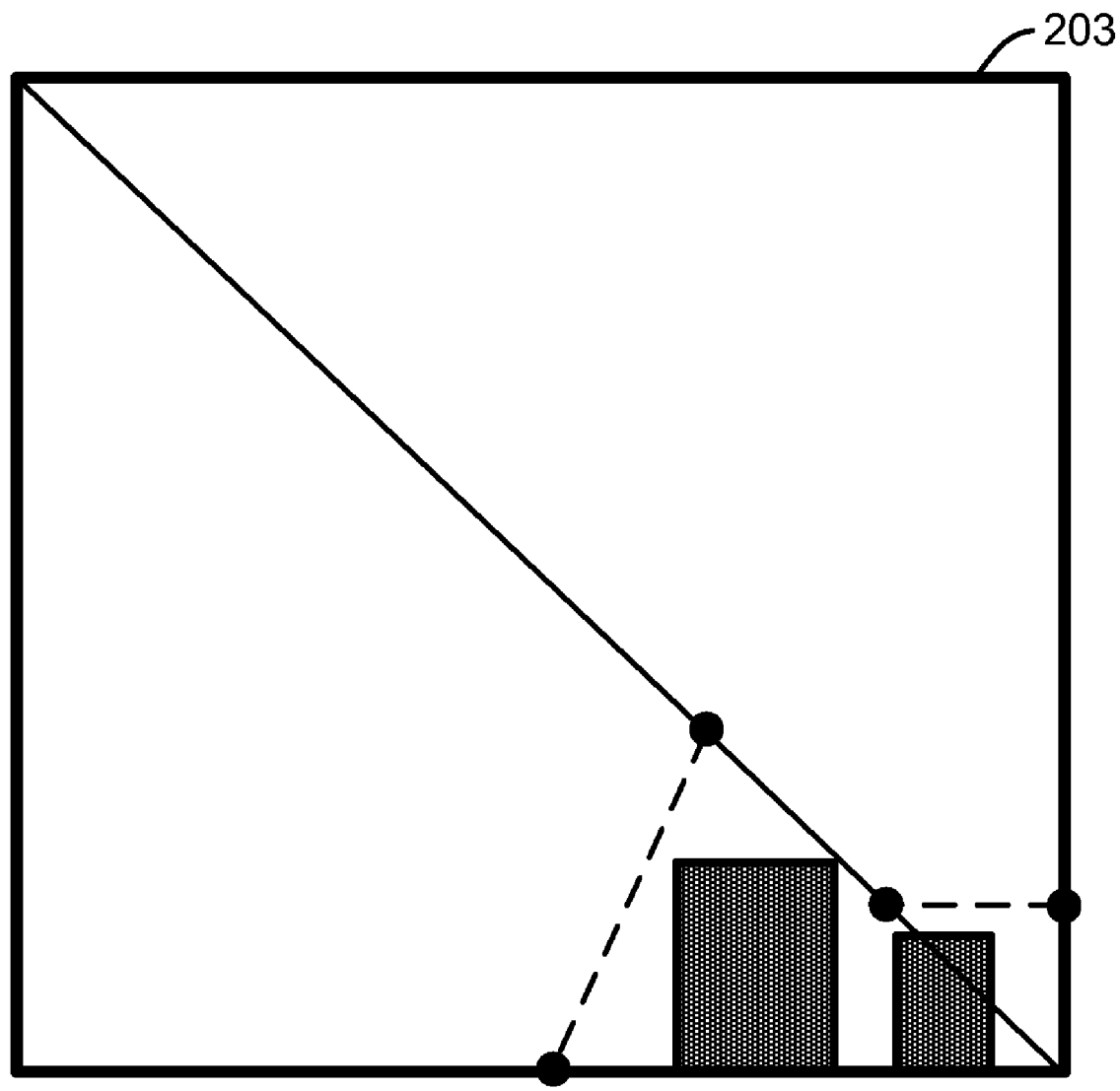
FIG. 2 shows geometric optimization of a surface.

FIG. 2-5 show graphical representations of an example technique to prepare a surface 203 for light map sampling with variable sampling rates. FIG. 2 shows geometric optimization of surface 203. Surface 203 is tessellated into different frequency regions. Surface may be subdivided according to the texture space Laplacian and gradient relative variance per triangle. After tessellation, surface 203 may be simplified to an acceptable number of vertices. For surface 203, the tessellation results in 8 vertices.

Figure 3:
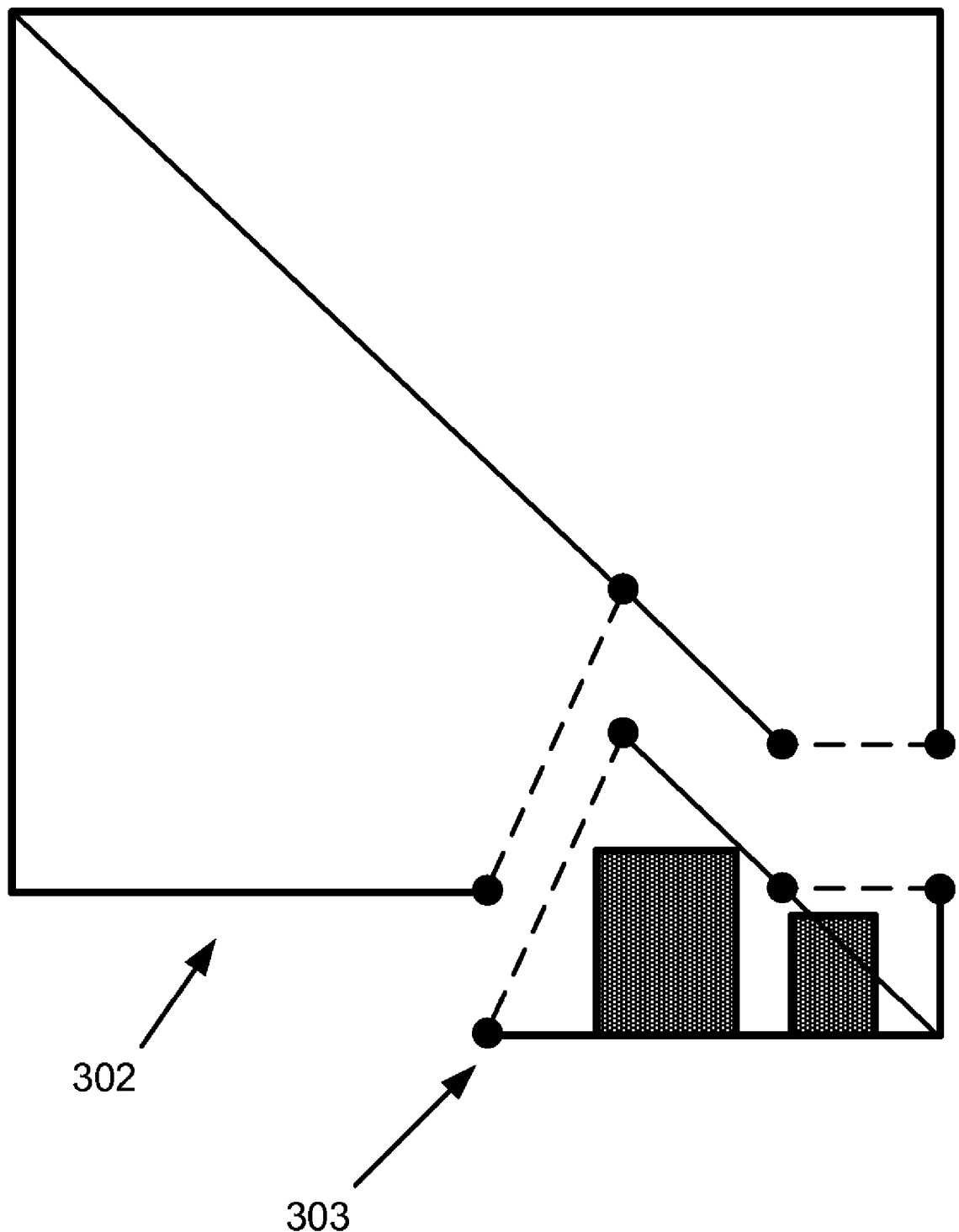
FIG. 3 shows sub-chart optimization of the surface shown in FIG. 2.
Figure 4:
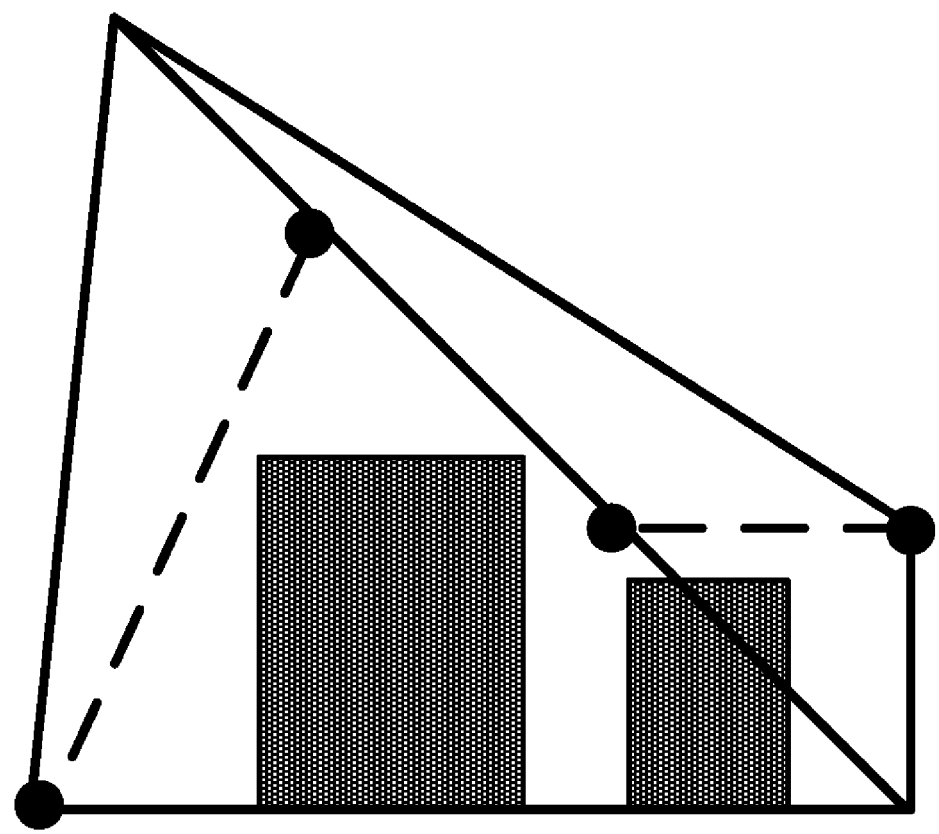
FIG. 4 shows intra-chart optimization of the surface shown in FIG. 2.

FIG. 3 shows sub-chart optimization of surface 203 shown in FIG. 2. After geometry optimization as shown in FIG. 2, surface 203 may be separated along edges into charts to maximize the compression ratio of each part. As shown in FIG. 3, surface 203 is separated into chart 302 and chart 303. FIG. 4 shows intra-chart optimization of surface 203 shown in FIG. 2. In FIG. 4, chart 303 as shown in FIG. 3 is optimized by balancing each triangle's area within the chart. For example, each triangle may be balanced by modifying texture coordinates of vertices (vertex uv) based on gradient and Laplacian. Thus, the texture space associated with each chart can be compressed based on the frequency associated with each triangle.

Figure 5:
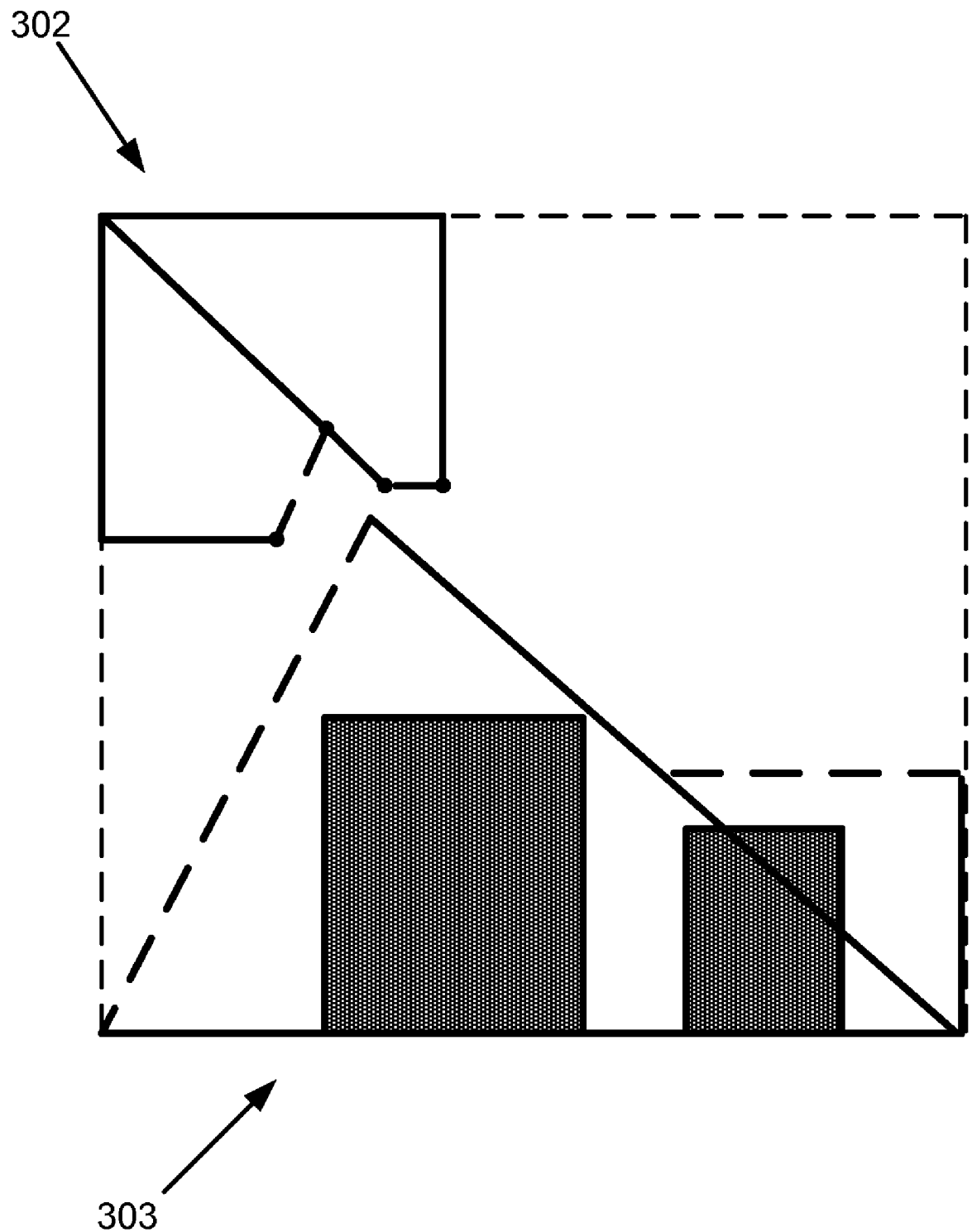
FIG. 5 shows inter-chart optimization of the surface shown in FIG. 2.

FIG. 5 shows inter-chart optimization of surface 203 shown in FIG. 2. The areas of the charts for surface 203 are balanced. Particularly, a high frequency chart needs a larger texture space than a low frequency chart. For example, as shown in FIG. 5, chart 303, which includes a higher frequency region, includes a larger area in texture space than chart 302, which includes a lower frequency region. Local integrated metric tensor (IMT) may be used to evaluate the importance of each chart in a surface.

Figure 6:
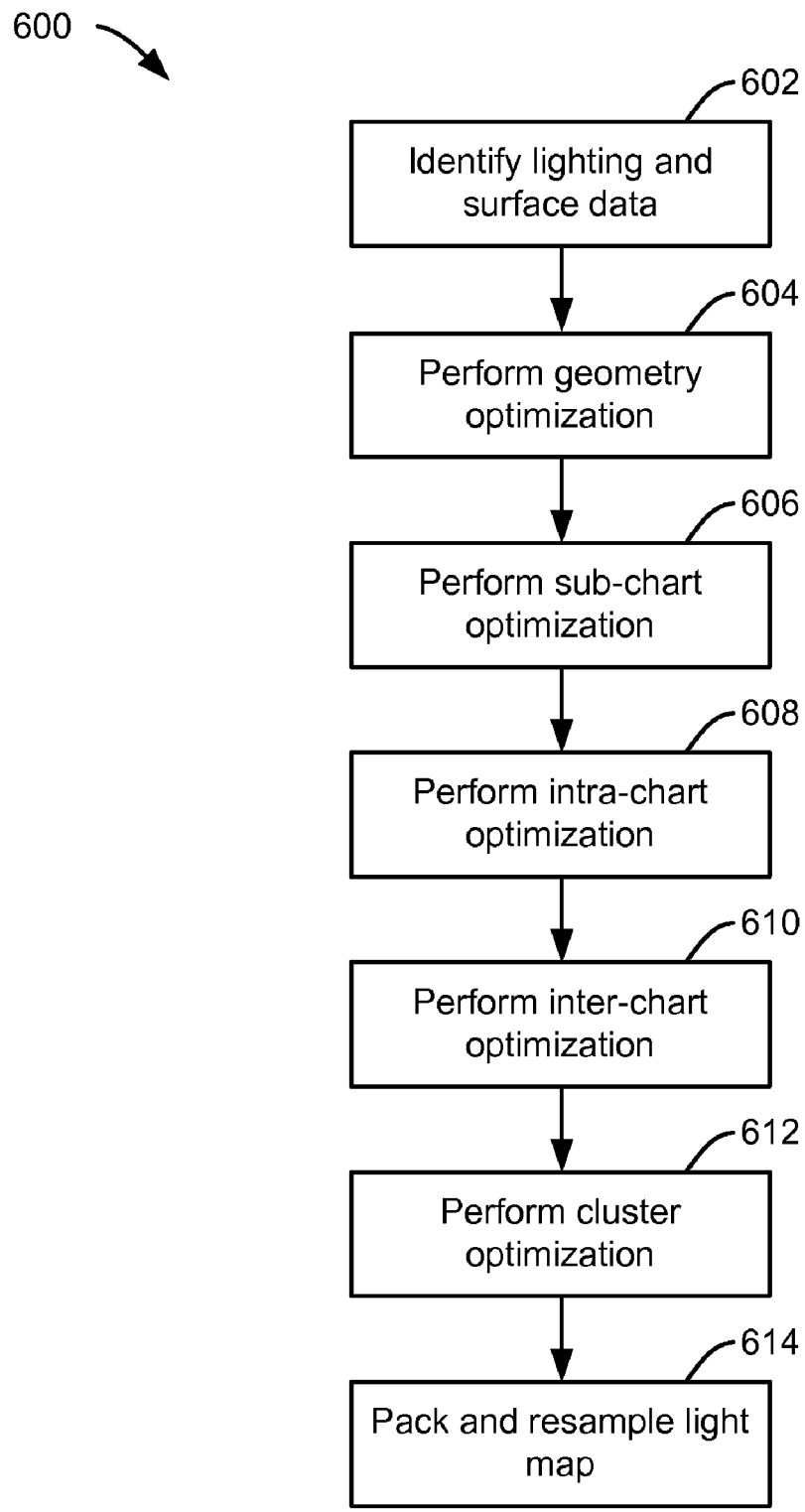
FIG. 6 shows an example process for compressing a light map.

FIG. 6 shows an example process 600 for compressing a light map. Process 600 may be implemented to generate a light map using different sampling rates on different regions of a surface. At block 602, lighting and surface data is identified. The lighting data may include the source and direction of lighting associated with a rendering environment. The surface data may include geometric data of surfaces associated with the rendering environment. The rendering environment may be any type of graphical space, such as a game level.

At block 604, geometry optimization is performed on the surfaces. Geometry optimization includes tessellating each surface into different frequency regions. The tessellation may be performed in accordance with Laplacian relative variance and obtaining an acceptable vertex number. At block 606, sub-chart optimization is performed. A surface with large Laplacian variance is divided into different charts so that each chart can be efficiently compressed.

At block 608, intra-chart optimization is performed. For each chart, the texture space can be compressed based on each triangle's frequency. Each triangle's area is balanced by modifying vertex uv, which may be based on gradient and Laplacian. At block 610, inter-chart optimization is performed. Each chart's area is balanced to achieve an efficient sampling rate. Local IMT may be used to perform the balancing. At block 612, cluster optimization is performed. The rendering environment is organized as clusters where each cluster is associated with a texture map.

Figure 7:
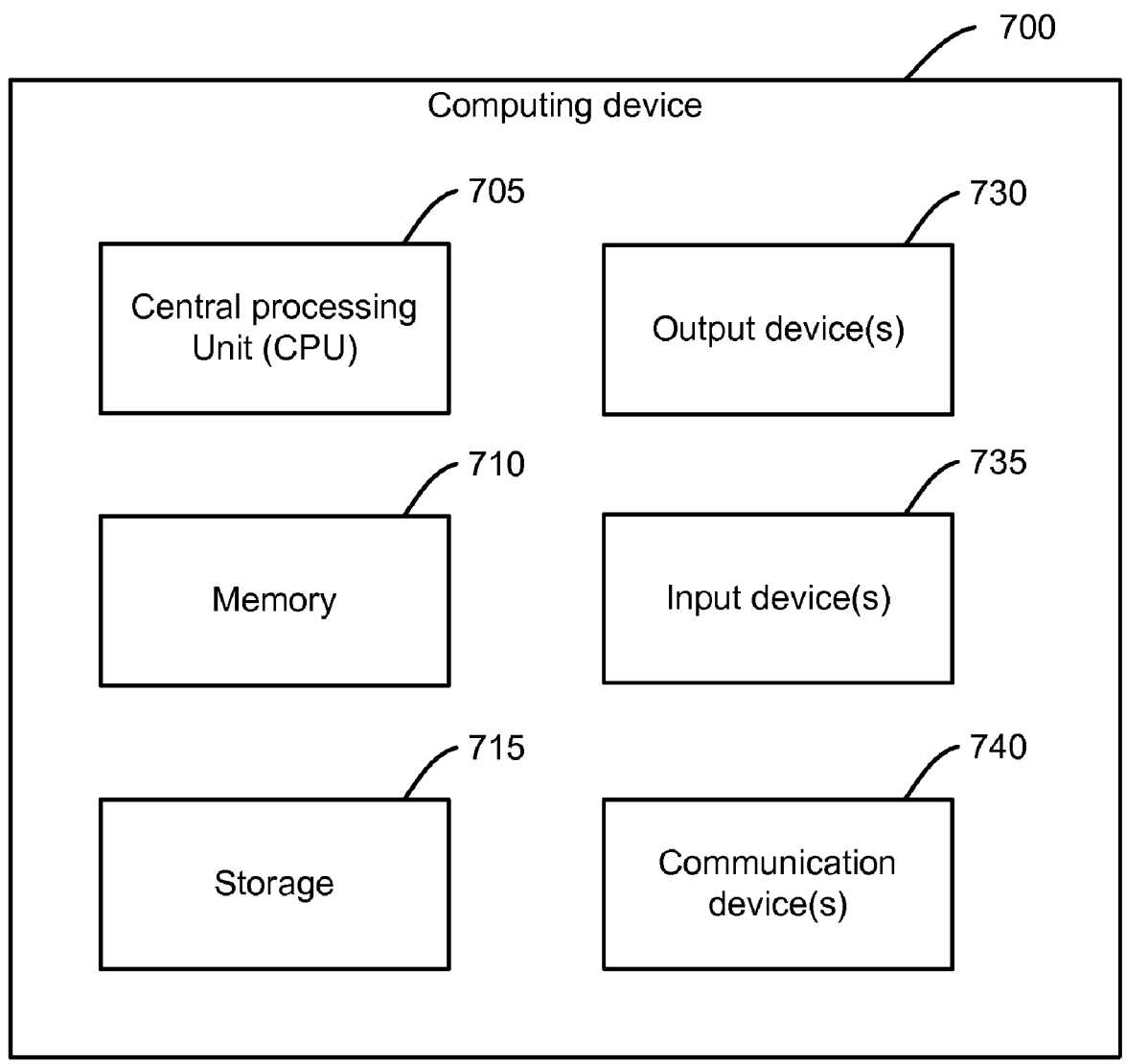
FIG. 7 shows an exemplary computer device for implementing the described systems and methods.

FIG. 7 shows an exemplary computer device 700 for implementing the described systems and methods. In its most basic configuration, computing device 700 typically includes at least one central processing unit (CPU) 705 and memory 710.

Depending on the exact configuration and type of computing device, memory 710 may be volatile (such as RAM), non-volatile (such as ROM, flash memory, etc.) or some combination of the two. Additionally, computing device 700 may also have additional features/functionality. For example, computing device 700 may include multiple CPU's. The described methods may be executed in any manner by any processing unit in computing device 700. For example, the described process may be executed by both multiple CPU's in parallel.

Computing device 700 may also include additional storage (removable and/or non-removable) including, but not limited to, magnetic or optical disks or tape. Such additional storage is illustrated in FIG. 7 by storage 715. Computer storage media includes volatile and nonvolatile, removable and non-removable media implemented in any method or technology for storage of information such as computer readable instructions, data structures, program modules or other data. Memory 710 and storage 715 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by computing device 700. Any such computer storage media may be part of computing device 700.

Computing device 700 may also contain communications device(s) 740 that allow the device to communicate with other devices. Communications device(s) 740 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer-readable media as used herein includes both computer storage media and communication media. The described methods may be encoded in any computer-readable media in any form, such as data, computer-executable instructions, and the like.

Computing device 700 may also have input device(s) 735 such as keyboard, mouse, pen, voice input device, touch input device, etc. Output device(s) 730 such as a display, speakers, printer, etc. may also be included. All these devices are well know in the art and need not be discussed at length.

Those skilled in the art will realize that storage devices utilized to store program instructions can be distributed across a network. For example a remote computer may store an example of the process described as software. A local or terminal computer may access the remote computer and download a part or all of the software to run the program. Alternatively the local computer may download pieces of the software as needed, or distributively process by executing some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

The invention claimed is:

1. One or more device-readable storage media encoded with device-executable instructions for performing steps that, when executed on a processor, perform a process, the process comprising:

identifying a surface associated with a graphical rendering environment;

calculating frequencies associated with areas of the surface, each frequency representing complexity of features in the associated area;

dividing the surface into regions based, at least in part, on the calculated frequencies;

allocating a sampling rate to each region based, at least in part, on the frequency corresponding to the region;

sampling lighting data in each region with the allocated sampling rate; and creating a light map associated with the surface based, at least in part, on the sampled lighting data.

2. The one or more device-readable storage media as recited in claim 1, further comprising determining edges of the regions based on either texture space Laplacian or gradient relative variance per triangle in the surface.

3. The one or more device-readable storage media as recited in claim 1, further comprising separating the surface into charts along edges associated with each region.

4. The one or more device-readable storage media as recited in claim 3, further comprising maximizing a compression ratio associated with each chart.

5. The one or more device-readable storage media as recited in claim 3, further comprising balancing an area associated with each triangle within each chart.

6. The one or more device-readable storage media as recited in claim 5, further comprising modifying texture coordinates of vertices in each chart to balance the chart.

7. The one or more device-readable storage media as recited in claim 6, wherein the vertex uv are modified based on at least one of texture space Laplacian or gradient relative variance.

8. The one or more device-readable storage media as recited in claim 3, further comprising balancing sampling rates associated with the charts of the surface based, at least in part, on the frequency associated with each chart.

9. The one or more device-readable storage media as recited in claim 8, further comprising balancing the sampling rates based, at least in part, on the local integrated metric tensor (IMT) associated with each chart of the surface.

10. One or more device-readable storage media encoded with device-executable components, the device-executable components, when executing on a processor comprising:

a graphical objects manager managing objects associated with the graphics generated by an application, the graphical objects manager also generating surface data that represents a surface of at least one of the objects;

a lighting manager determining lighting data provided by the application; and a light map generator receiving lighting and surface data from the lighting manager and the graphical object manager, the light map generator also determining frequencies associated with areas of the surface to tessellate the surface into regions based on the determined frequencies, the light map generator allocating a sampling rate for each region based on the frequency associated with the region and sampling the regions with the allocated sampling rates to generate a light map corresponding to the surface, wherein the light map is used to generate output to be displayed on a display.

11. The one or more device-readable storage media as recited in claim 10, wherein the surface data includes a mesh of polygons that represent surfaces of the graphical objects.

12. The one or more device-readable storage media as recited in claim 10, wherein the lighting data includes at least one of sources or directions of lighting associated with the graphical objects.

13. The one or more device-readable storage media as recited in claim 10, wherein the frequencies determined by the light map generator represent complexity of features in each region.

14. The one or more device-readable storage media as recited in claim 13, wherein the frequencies are determined by at least one of texture space Laplacian, gradient relative variance per triangle of the surface, or frequency analytical method.

15. The one or more device-readable storage media as recited in claim 10, wherein the light map generator balances the sampling rates among the regions so that the balanced sampling rates do not cause a total size of the light map to exceed an allocated maximum size.

16. An apparatus comprising:

a processor, memory, and a display;

the processor identifying lighting and surface data stored in memory of the apparatus and associated with a surface in a rendering environment executing on the apparatus device, the surface comprising data stored in the memory;

the processor determining frequencies associated with areas of the surface;

the processor tessellating the surface into regions based on the determined frequencies, the regions comprising data in the memory;

the processor allocating a sampling rate to each region based on the frequency corresponding to the region;

the processor sampling lighting data in each region with the allocated frequency, where the lighting data is stored in the memory;

the processor creating a light map for the surface based on the sampled lighting data; and the display displaying output generated by the rendering environment based on the lighting data.

17. The apparatus as recited in claim 16, the processor tessellating the surface based on either texture space Laplacian or gradient relative variance per triangle in the surface.

18. The apparatus as recited in claim 16, wherein the processor performs geometry optimization.

19. The apparatus as recited in claim 16, wherein the processor performs sub-chart optimization.

20. The apparatus as recited in claim 19, further comprising:

the processor performing intra-chart optimization;
the processor performing inter-chart optimization;
the processor performing cluster optimization; and
the processor re-sampling the light map.

* * * * *